US012562420B2

(12) United States Patent
Won

(10) Patent No.: US 12,562,420 B2
(45) Date of Patent: Feb. 24, 2026

(54) PROTECTION DEVICE FOR SECONDARY BATTERY AND BATTERY PACK INCLUDING THE SAME

(71) Applicant: INCECO CO., LTD., Cheonan-si (KR)

(72) Inventor: Se Hee Won, Cheonan-si (KR)

(73) Assignee: INCECO CO., LTD., Cheonan-si (KR)

( * ) Notice: Subject to any disclaimer, the term of this patent is extended or adjusted under 35 U.S.C. 154(b) by 581 days.

(21) Appl. No.: 18/008,970

(22) PCT Filed: Oct. 22, 2021

(86) PCT No.: PCT/KR2021/014939
§ 371 (c)(1),
(2) Date: Dec. 8, 2022

(87) PCT Pub. No.: WO2022/114537
PCT Pub. Date: Jun. 2, 2022

(65) Prior Publication Data
US 2023/0231239 A1 Jul. 20, 2023

(30) Foreign Application Priority Data

Nov. 27, 2020 (KR) ........................ 10-2020-0162747

(51) Int. Cl.
*H01M 50/143* (2021.01)
*H01M 50/583* (2021.01)
(52) U.S. Cl.
CPC ....... *H01M 50/143* (2021.01); *H01M 50/583* (2021.01); *H01M 2200/103* (2013.01)
(58) Field of Classification Search
CPC ............. H01M 50/143; H01M 50/583; H01M 50/581; H01M 50/572; H01M 2200/103;
(Continued)

(56) References Cited

U.S. PATENT DOCUMENTS 11,201,026 B2 * 12/2021 Su .......................... H01H 83/20
2012/0001720 A1 * 1/2012 Kimura ................ H01H 85/046
337/297
(Continued)

FOREIGN PATENT DOCUMENTS

JP 2013-239405 A 11/2013
KR 10-2011-0089166 A 8/2011
(Continued)

OTHER PUBLICATIONS

English Translation of KR 20170021403 A—Circuit protection device and method of manufacturing the same; Feb. 28, 2017; Smart Electronic Inc. (Year: 2017).*

*Primary Examiner* — Adam J Francis
(74) *Attorney, Agent, or Firm* — You & IP, LLC

(57) ABSTRACT

Disclosed are a protection device for a secondary battery in which two flux cores are embedded in a fusible element to be separated from each other and be disposed adjacent to fusible element electrodes on both sides of the fusible element so that it is not necessary to apply a flux onto the surface of the fusible element, a manufacturing process for uniformly applying the flux is eliminated to significantly reduce a manufacturing cost, a first flux core and a second flux core embedded in the fusible element attract fused matters of the fusible element toward the fusible element electrodes on both sides of the fusible element when the fusible element is fused, to improve the fusing performance of the fusible element, and a current path is reliably cut off after the fusible element is fused.

6 Claims, 5 Drawing Sheets

(58) Field of Classification Search
 CPC ......... H01M 2200/00; H01M 2200/10; H01M
 10/425; H01H 37/76
 See application file for complete search history.

(56) References Cited

U.S. PATENT DOCUMENTS

| | | | | |
|---|---|---|---|---|
| 2015/0130585 A1* | 5/2015 | Nakajima | .............. | H01H 37/64 |
| | | | | 337/413 |
| 2015/0249332 A1* | 9/2015 | Kang | .................... | H02H 9/044 |
| | | | | 361/91.1 |
| 2016/0071680 A1* | 3/2016 | Mukai | ................. | H01H 37/761 |
| | | | | 337/183 |
| 2018/0097352 A1* | 4/2018 | Su | ......................... | H02H 5/041 |

FOREIGN PATENT DOCUMENTS

| | | | | | |
|---|---|---|---|---|---|
| KR | 10-2014-0139040 A | 12/2014 | | | |
| KR | 10-2016-0003168 A | 1/2016 | | | |
| KR | 10-2017-0021403 A | 2/2017 | | | |
| KR | 20170021403 A | * | 2/2017 | ............ | H01H 37/76 |
| KR | 10-2018-0104754 A | 9/2018 | | | |
| KR | 10-2227864 B1 | 3/2021 | | | |

* cited by examiner (a)

160    162a                    162b (b)

160    162a        162c        162b

PROTECTION DEVICE FOR SECONDARY BATTERY AND BATTERY PACK INCLUDING THE SAME

TECHNICAL FIELD

Various embodiments generally relate to a protection device for a secondary battery and a battery pack including the same, and more particularly, to a protection device for a secondary battery and a battery pack including the same capable of reliably cutting off a current path after a fusible element is fused, reducing the number of manufacturing processes and a manufacturing cost of the protection device for a secondary battery and preventing a secondary accident such as the explosion of a battery.

BACKGROUND ART

In general, a secondary battery as a rechargeable power storage device is used in various industrial fields such as a mobile terminal such as a smart phone, an electric vehicle and an ESS. A secondary battery mainly used is a lithium-ion battery which uses lithium-cobalt oxide as one electrode and graphite as the other electrode. The lithium-ion battery has advantages of high energy density, low volume and stability compared to a nickel-cadmium or nickel-hydrogen battery. However, as the number of charge/discharge increases, a problem may arise in that the storage capacity and the lifetime decrease. Thus, recently, other alternative electrodes such as carbon nanotubes (CNTs) have been developed.

The secondary battery represented by the lithium-ion battery may generate heat due to overcharging or overdischarging, so a protection circuit is used. However, despite the use of such a protection circuit, recently, accidents in which a battery pack of a secondary battery ignites frequently occur.

For example, a switch such as an FET used in a lithium-ion battery pack is short-circuited to cause an overcurrent to flow or a surge voltage is applied to cause an overvoltage to flow, generating high heat, and such abnormal overheating can cause fire or explosion accidents of the battery pack.

In order to prevent this, a protection device which is fused by an overcurrent and an overvoltage is used in parallel with the protection circuit inside the secondary battery pack. The conventional protection device performs a protection operation against an overcurrent in such a way that, when the overcurrent is applied between two electrodes, a fusible element is fused to cut off a current path between the two electrodes. In addition, a heating element is used to operate against an overvoltage, and when the heating element is heated by the overvoltage, the fusible element is fused to cut off the current path.

Many attempts have been made to improve the fusing performance of the protection device, and a representative method is to apply a flux to the surface of the fusible element. The flux functions in such a manner that, as the flux is fused together when the fusible element is fused by being heated, the flux attracts the fused matters of the fusible element toward the electrodes to assist in a reliable fusing operation.

However, due to a problem caused in that it is necessary to uniformly apply the flux onto the fusible element, the conventional protection device requires a structure for supporting the flux on the inner surface of a cover member, as disclosed in Korean Patent Application Publication No. 10-2011-0089166 entitled "Protection Device" and Korean Patent Application Publication No. 10-2014-0139040 entitled "Protection Device." The addition of such a structure serves as a factor that inhibits the light weight, thinness, compactness and miniaturization of the protection device and increases the manufacturing cost. Moreover, it is substantially impossible to completely uniformly apply the flux, which impairs the heat generation distribution uniformity of the fusible element and lengthens the fusing time of the protection device, and a problem is caused in that a fine energization phenomenon between two separated electrodes occurs because a reliable fusing operation is not performed. When a current path is formed after fusing of the fusible element, the battery generates heat to a high temperature, and thus, the possibility of a secondary accident such as the explosion of the battery to occur increases.

DISCLOSURE

Technical Problem

Various embodiments are directed to a protection device for a secondary battery in which two flux cores are embedded in a fusible element to be separated from each other and be disposed adjacent to fusible element electrodes on both sides of the fusible element so that it is not necessary to apply a flux onto the surface of the fusible element, a manufacturing process for uniformly applying the flux is eliminated to significantly reduce a manufacturing cost, a first flux core and a second flux core embedded in the fusible element attract fused matters of the fusible element toward the fusible element electrodes on both sides of the fusible element when the fusible element is fused, to improve the fusing performance of the fusible element, and a current path is reliably cut off after the fusible element is fused, and a battery pack which, through this, can prevent a secondary accident such as the explosion of a battery.

Also, various embodiments are directed to additionally embedding a third flux core between the first flux core and the second flux core in the fusible element so that the intermediate third flux core is fused earlier than the fusible element to guide the fused matters of the fusible element toward the first flux core and the second flux core, thereby further improving the fusing performance of the fusible element.

Technical Solution

In an embodiment, a protection device for a secondary battery may include: an insulating substrate; a first heating element connection electrode and a second heating element connection electrode disposed at one end and the other end, respectively, of the insulating substrate; a heating element stacked on the first heating element connection electrode and the second heating element connection electrode to connect them to each other; an insulating member disposed on the heating element; a first fusible element electrode and a second fusible element electrode disposed on both side portions of the insulating substrate to be separated from each other; a fusible element connecting the first fusible element electrode and the second fusible element electrode, disposed over the heating element in a state in which the fusible element is insulated from the heating element by the insulating member, and fused at a fusing current or higher by being heated by the heating element; a first flux core embedded in the fusible element to be adjacent to the first fusible element electrode, and attracting a fused matter, formed as the fusible element is fused, toward the first fusible element electrode; and a second flux core embedded in the fusible element to be adjacent to the second fusible element electrode and be separated by a predetermined distance from the first flux core, and attracting a fused matter of the fusible element toward the second fusible element electrode.

The protection device for secondary battery according to another embodiment of the present disclosure further comprises a third flux core embedded in the fusible element, and disposed between the first flux core and the second flux core.

According to further another embodiment of the present disclosure, the fusible element is manufactured by being punched in a state in which the first flux core, the second flux core and the third flux core are embedded by being rolled in a lengthwise direction.

According to further another embodiment of the present disclosure, the first flux core and the second flux core are activated at the same first activation temperature, and the third flux core is activated at a second activation temperature lower than the first activation temperature.

According to further another embodiment of the present disclosure on a periphery of the insulating substrate, terminal extensions are formed concavely inward of vertical walls to extend from the first heating element connection electrode, the second heating element connection electrode, the first fusible element electrode and the second fusible element electrode, respectively, so as to guide downward fused matters of the fusible element, and a conductive material is printed on inner wall surfaces of the terminal extensions to reduce insulation resistances of the respective electrodes.

A battery pack according to an embodiment of the present disclosure comprises a protection device for a secondary battery; and at least one battery cell in which the protection device for a secondary battery is connected in terms of circuit between a positive terminal and a negative terminal.

Advantageous Effects

According to a protection device for a secondary battery and a battery pack including the same in accordance with embodiments of the present disclosure, by embedding a first flux core and a second flux core in a fusible element to be separated from each other and be disposed adjacent to a first fusible element electrode and a second fusible element electrode, respectively, on both sides of the fusible element, it is not necessary to apply a flux onto the surface of the fusible element, a manufacturing process for uniformly applying the flux is eliminated to significantly reduce a manufacturing cost, the first flux core and the second flux core embedded in the fusible element attract fused matters of the fusible element toward the first fusible element electrode and the second fusible element electrode when the fusible element is fused, to allow the fused matters of the fusible element to separately flow toward both the electrodes, thereby improving the fusing performance of the fusible element, a current path is reliably cut off after the fusible element is fused, and ultimately, an explosion accident of a battery using a secondary battery is prevented.

Also, according to the embodiments of the present disclosure, by additionally embedding a third flux core between the first flux core and the second flux core in the fusible element, the intermediate third flux core is fused earlier than the fusible element to guide the fused matters of the fusible element toward the first flux core and the second flux core, thereby further improving the fusing performance of the fusible element.

MODE FOR DISCLOSURE

Figure 1:
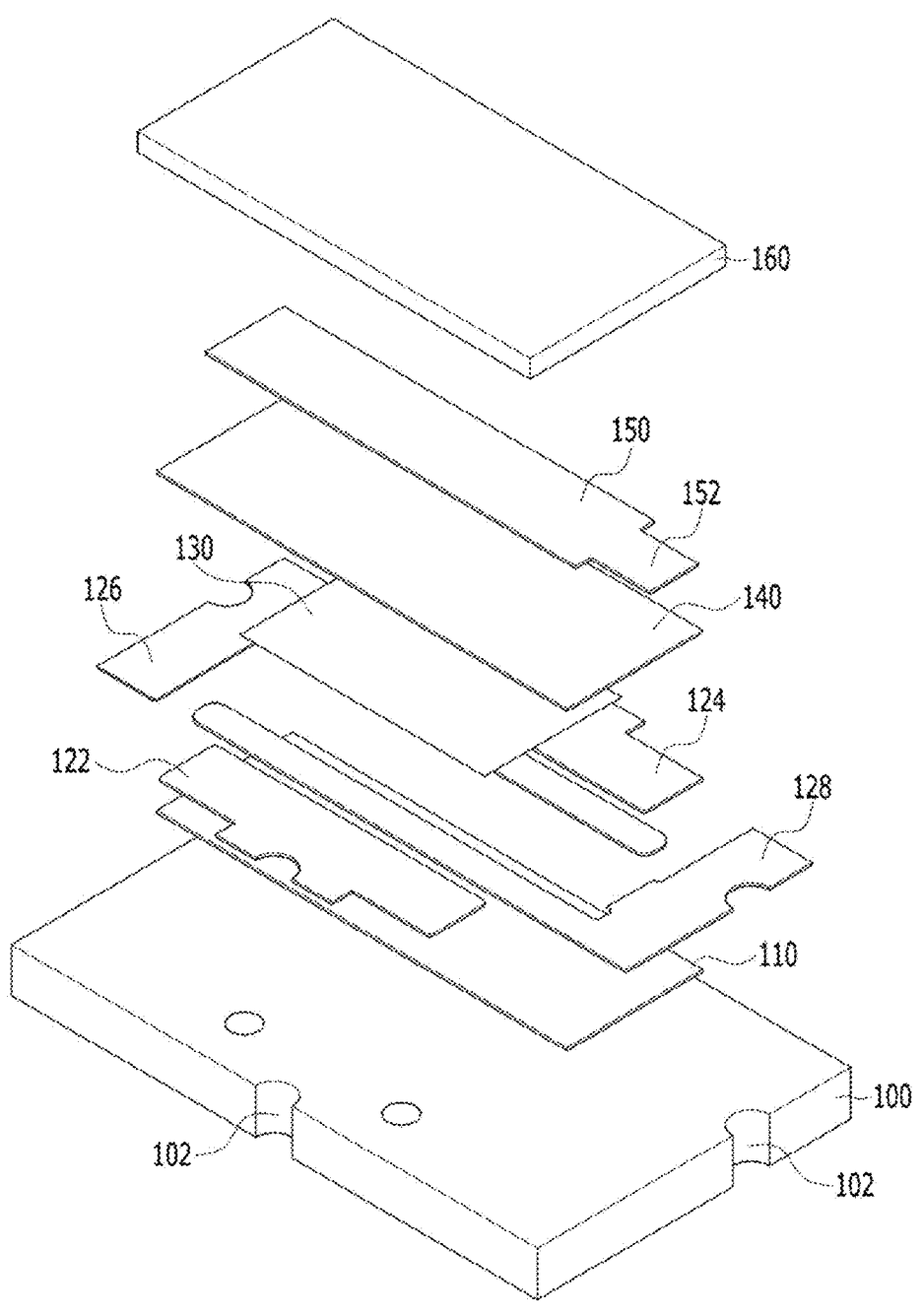
FIG. 1 is an exploded perspective view of a protection device for a secondary battery in accordance with an embodiment of the present disclosure.

The same reference numeral is assigned to a portion having a similar element and operation throughout the specification. Furthermore, the accompanying drawings of the present disclosure are for convenience of description, and shapes and relative criteria thereof may be exaggerated or omitted.

In specifically describing the embodiments, a redundant description or a description of a technique evident in a corresponding field has been omitted. Furthermore, in the following description, when it is said that one element "includes" the other element, the word "include" means that the one element may further include an element other than the describe element unless explicitly described to the contrary.

Furthermore, a term, such as " . . . unit", " . . . er (or . . . or)", or " . . . module" described in the specification, means a unit for processing at least one function or operation, and this may be implemented by hardware or software or a combination thereof.

Furthermore, when it is described that one part is electrically connected to another part, it should be understood that the two parts may be directly connected to each other, or may be connected to each other with a third part interposed therebetween.

Terms, such as a "first" and a "second", may be used to describe various elements, but the elements are not limited by the terms. The terms are used to only distinguish one element from the other element. For example, a first element may be named a second element without departing from the scope of a right of the present disclosure. Likewise, a second element may be named a first element.

Figure 2:
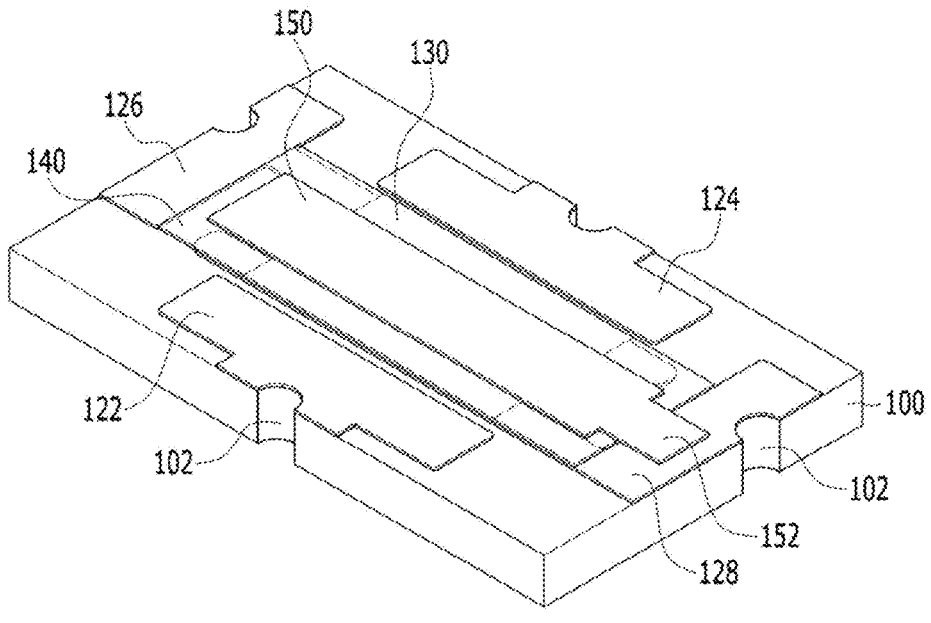
FIG. 2 is a perspective view illustrating a package assembly state before a fusible element is coupled.
Figure 3:
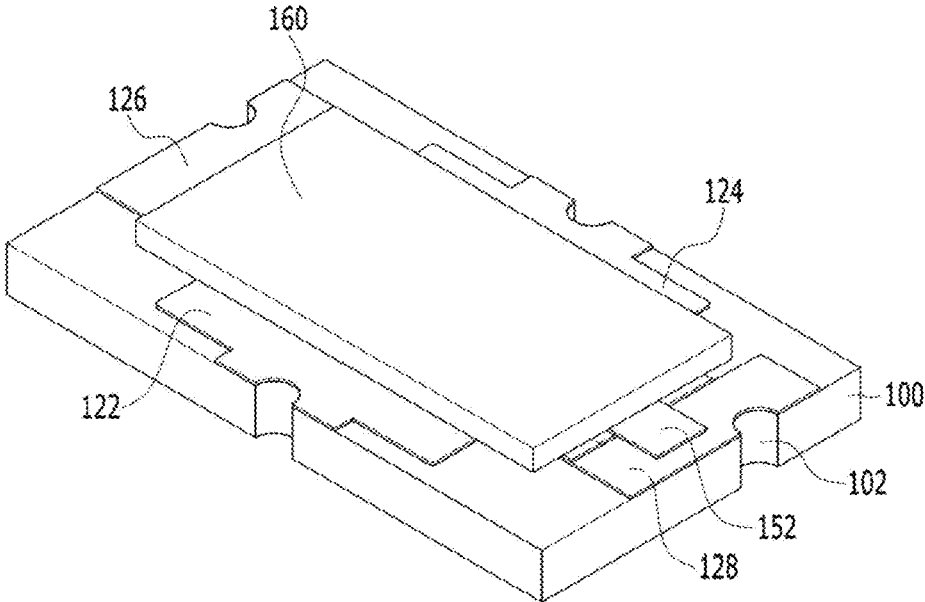
FIG. 3 is a perspective view illustrating a package state in which the fusible element is coupled in FIG. 2.
Figure 4:
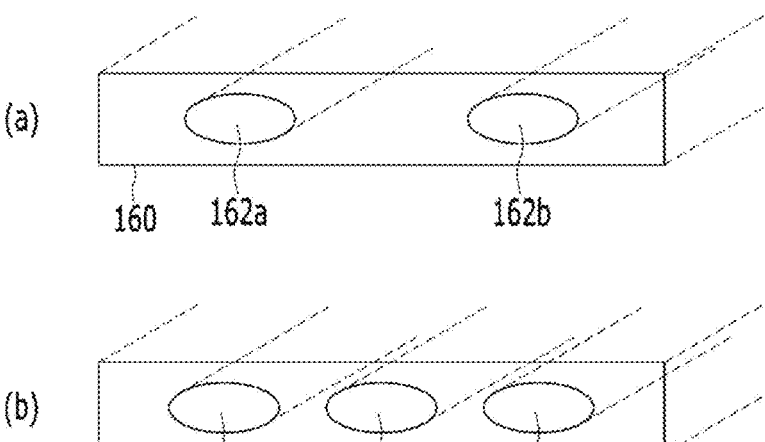
FIG. 4 is a view illustrating the fusible element having embedded therein flux cores in accordance with the embodiment of the present disclosure.

FIG. 1 is an exploded perspective view of a protection device for a secondary battery in accordance with an embodiment of the present disclosure, FIG. 2 is a perspective view illustrating a package assembly state before a fusible element is coupled, FIG. 3 is a perspective view illustrating a package state in which the fusible element is coupled in FIG. 2, and FIG. 4 is a view illustrating the fusible element having embedded therein flux cores in accordance with the embodiment of the present disclosure.

Hereinafter, detailed embodiments according to the present disclosure are described with reference to the accompanying drawings. It is however to be understood that the present disclosure is not intended to be limited to the specific embodiments and includes all changes, equivalents and substitutions which fall within the spirit and technical scope of the present disclosure.

FIGS. 1 to 4 illustrate the internal components of the protection device for a secondary battery in accordance with the embodiment of the present disclosure, and a finished product which is in an assembled state as illustrated in FIG. 3 may be provided in the form of a package by being received in an unillustrated housing. As will be described with reference to FIGS. 5 and 6, the package may have three external terminals (in some cases, the package may have two or four external terminals). Two external terminals are terminals which are connected to a fusible element inside the package, and one of the two external terminals and the remaining external terminal may be terminals which are connected to a heating element inside the package. The housing may include an upper cover made of an insulating material.

The internal configuration of the package will be described below in detail with reference to FIGS. 1 to 4.

First, referring to the exploded perspective view of FIG. 1, the protection device for a secondary battery in accordance with the embodiment of the present disclosure includes an insulating substrate 100, a first insulating member 110, a first fusible element electrode 122, a second fusible element electrode 124, a first heating element connection electrode 126, a second heating element connection electrode 128, a heating element 130, a second insulating member 140, a heating element intermediate electrode 150, and a fusible element 160. The respective components are sequentially stacked as illustrated in the exploded perspective view of FIG. 1.

The insulating substrate 100 as a substrate which is made of an electrically insulating material is, for example, a ceramic substrate. As illustrated, on the upper surface of the insulating substrate 100, there are disposed the first fusible element electrode 122, the second fusible element electrode 124, the first heating element connection electrode 126 and the second heating element connection electrode 128, and the first insulating member 110 is stacked on the center portion of the insulating substrate 100. The insulating substrate 100 may have the form of a printed circuit board (PCB) on which respective electrodes are printed.

The first fusible element electrode 122 and the second fusible element electrode 124 are disposed on both side portions of the insulating substrate 100 to be separated from each other. In the figure, the outwardly protruding portions of the first fusible element electrode 122 and the second fusible element electrode 124 are portions for connecting external terminals. The fusible element 160 as a conductor which connects the first fusible element electrode 122 and the second fusible element electrode 124 is made of a material which is fused at a fusing current or higher or is fused by being heated by a heating element to be described later.

The first heating element connection electrode 126 and the second heating element connection electrode 128 are disposed on one end and the other end, respectively, of the insulating substrate 100. The heating element 130 is stacked to connect the first heating element connection electrode 126 and the second heating element connection electrode 128. The first insulating member 110 is positioned under the heating element 130 to maintain an insulating state between the upper surface of the insulating substrate 100 and the heating element 130. The heating element 130 is made of a material which generates heat by an electrical resistance when an overvoltage is applied between the first heating element connection electrode 126 and the second heating element connection electrode 128.

The second insulating member 140 is stacked on top of the heating element 130 and is made of an insulating material which has a high heat transfer rate so that the heating element 130 is not brought into direct electrical connection to the fusible element 160 but heat generated in the heating element 130 is well transferred to the fusible element 160.

A heating element intermediate electrode extension 152 extending from one end of the heating element intermediate electrode 150 is connected to the second heating element connection electrode 128. The heating element intermediate electrode 150 as an electrode which is connected in a lengthwise direction of the center portion of the fusible element 160 is an electrode to allow the second heating element connection electrode 128 and the fusible element 160 to form an electric circuit as will be described later with reference to circuit diagrams of FIGS. 5 and 6.

Referring to (a) of FIG. 4, a first flux core 162*a* and a second flux core 162*b* may be embedded in the fusible element 160. The first flux core 162*a* and the second flux core 162*b* are disposed in the fusible element 160 to be separated from each other. The first flux core 162*a* is disposed adjacent to the first fusible element electrode 122, and serves to attract the fused matter of the fusible element 160 toward the first fusible element electrode 122 when the fusible element 160 is fused. The second flux core 162*b* is disposed adjacent to the second fusible element electrode 124, and serves to attract the fused matter of the fusible element 160 toward the second fusible element electrode 124 when the fusible element 160 is fused.

Referring to (b) of FIG. 4, three flux cores 162*a*, 162*b* and 162*c* may be embedded in the fusible element 160. The disposition positions and roles of the first flux core 162*a* and the second flux core 162*b* are as described above with reference to (a) of FIG. 4. A third flux core 162*c* is disposed between the first flux core 162*a* and the second flux core 162*b*. The third flux core 162*c* promotes a phenomenon in which the fusible element 160 is split when the fusible element 160 is fused and attracted to be collected to the fusible element electrodes 122 and 124 on both sides.

The fusible element 160 may be manufactured by being punched in a state in which the first flux core 162*a* and the second flux core 162*b* are embedded by being rolled in a lengthwise direction as illustrated in (a) of FIG. 4 or in a state in which the third flux core 162*c* is additionally embedded by being rolled in a longitudinal direction as illustrated in (b) of FIG. 4.

Each of the flux cores 162*a*, 162*b* and 162*c* promotes the fusion of the fusible element 160, attracts the fusible element 160 toward electrodes to collect the fusible element 160, and is activated at a lower temperature than the fusible element 160. The first flux core 162*a* and the second flux core 162*b* may be activated at the same first activation temperature, and the third flux core 162*c* may be activated at a second activation temperature lower than the first activation temperature.

Therefore, in a process in which the fusible element 160 is fused, the third flux core 162*c* is first fused so that fusion starts at the center portion of the fusible element 160. The first flux core 162*a* and the second flux core 162*b* function to attract and collect the fused matters of the fusible element

160 toward the first fusible element electrode 122 and the second fusible element electrode 124, respectively. Accordingly, as will be described later with reference to FIGS. 7 to 9, the fusing characteristics of the fusible element 160 are greatly improved, and even after the fusible element 160 is fused, the formation of a current path by a residue may be fundamentally blocked.

Referring to FIGS. 1 to 3, on the periphery of the insulating substrate 100, terminal extensions 102 are formed concavely inward of vertical walls to extend from the first fusible element electrode 122, the second fusible element electrode 124, the first heating element connection electrode 126 and the second heating element connection electrode 128, respectively. A conductive material is printed on the inner wall surface of each terminal extension 102 to increase the surface area of each electrode, thereby reducing insulation resistance and providing a structure for easily connecting an external terminal of the protection device for a secondary battery. In addition, as the terminal extensions 102 are formed concavely inward of the vertical wall surfaces of the insulating substrate 100 to form predetermined spaces, the fused matters of the fusible element 160 may be guided to be introduced into the spaces, and even after the fused matters of the fusible element 160 are cured, the cured matters may be sufficiently separated from one another not to form a current path.

Figure 5:
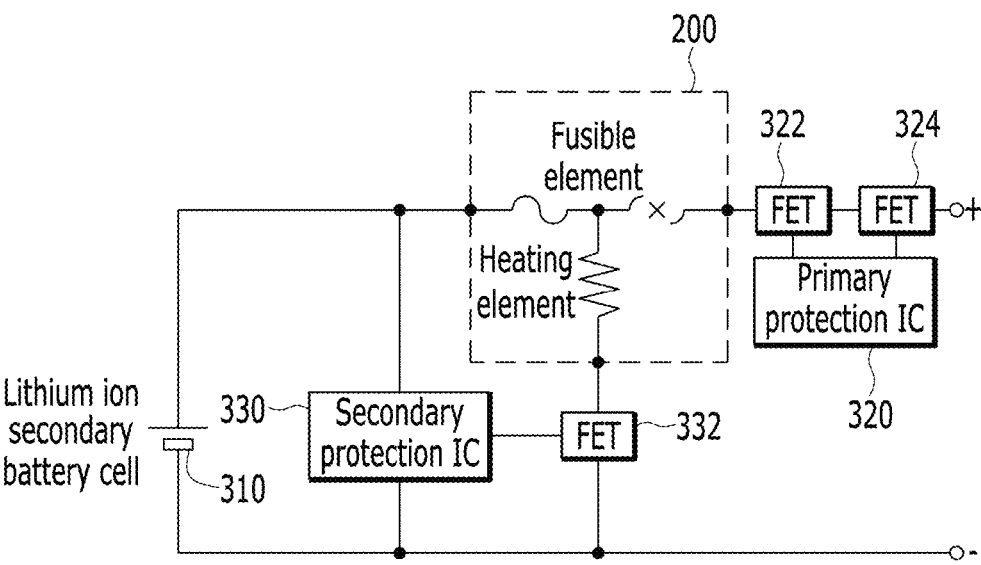
FIG. 5 is an equivalent circuit diagram illustrating a fusing operation by an overcurrent in accordance with the embodiment of the present disclosure.
Figure 6:
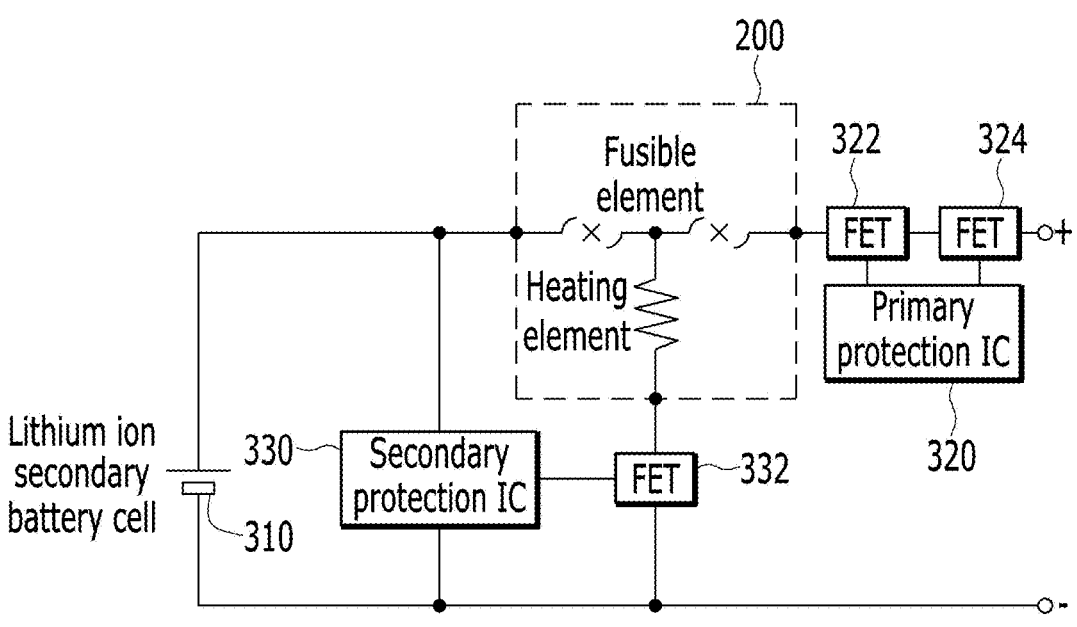
FIG. 6 is an equivalent circuit diagram illustrating a fusing operation by an overvoltage in accordance with the embodiment of the present disclosure.

FIG. 5 is an equivalent circuit diagram illustrating a fusing operation by an overcurrent in accordance with the embodiment of the present disclosure, and FIG. 6 is an equivalent circuit diagram illustrating a fusing operation by an overvoltage in accordance with the embodiment of the present disclosure. Operation characteristics that the protection device for a secondary battery in accordance with the embodiment of the present disclosure is fused by an overcurrent and an overvoltage will be described with reference to FIGS. 5 and 6.

Referring to FIGS. 5 and 6, two serial switching FETs 322 and 324 are connected in series between the positive terminal of a battery cell 310 and the positive output terminal of a battery pack, and a primary protection IC 320 for overcurrent protection is installed thereto. One parallel switching FET 332 and a secondary protection IC 330 for overvoltage protection are installed between the positive terminal and the negative terminal of the battery cell 310. The battery cell 310 may be configured by a lithium-ion battery cell or another secondary battery capable of charging and discharging. A protection device package 200 to which the protection device for a secondary battery in accordance with the embodiment of the present disclosure is applied is connected between the positive terminal charge/discharge path of the battery cell 310 and the parallel switching FET 332 of a circuit line for overvoltage protection.

As illustrated in FIG. 5, when an overcurrent flows through a serial line in the charging/discharging path of the battery cell 310, for example, when an overcurrent is applied between the first fusible element electrode 122 and the second fusible element electrode 124, the fusible element 160 is fused by the overcurrent. In the circuit of FIG. 5, the fusible element 160 is exemplified as configuring two fuses to illustrate the fusible element 160 on both sides of the heating element intermediate electrode 150 as an equivalent circuit. In the equivalent circuit, one of the positive terminal of the battery cell 310 and the positive terminal of the battery pack through which more current flows (usually, the positive terminal of the battery pack) is first fused to cut off a current path.

As illustrated in FIG. 6, when an overvoltage is applied to both ends of the battery cell 310, that is, when an overvoltage is applied between the heating element intermediate electrode 150 and a first fusible element electrode (or a second fusible element electrode) within the protection device package 200, the heating element 130 generates heat. The fusible element 160 is fused and cut by the heat of the heating element 130. As illustrated in FIG. 6, the fusible element 160 is completely fused in the equivalent circuit, and fused states are experimented and shown in FIGS. 7 to 9.

Figure 7:
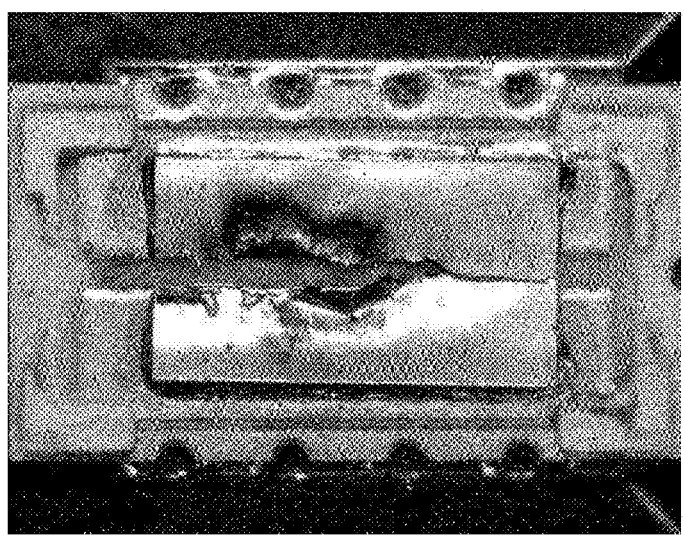
FIGS. 7 to 9 are photographs showing results of fusing experiments conducted under the same environment for a structure with no flux, a structure in which a flux is applied on a fusible element and a fusible element structure in which three flux cores are embedded in accordance with the embodiment of the present disclosure.
Figure 8:
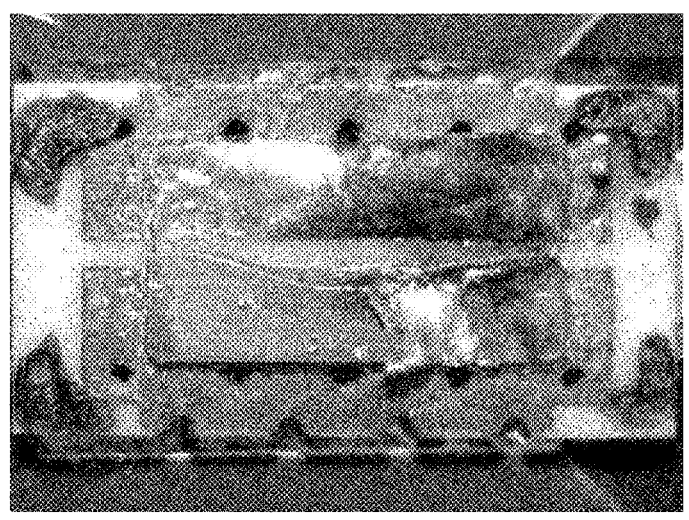
Figure 9:
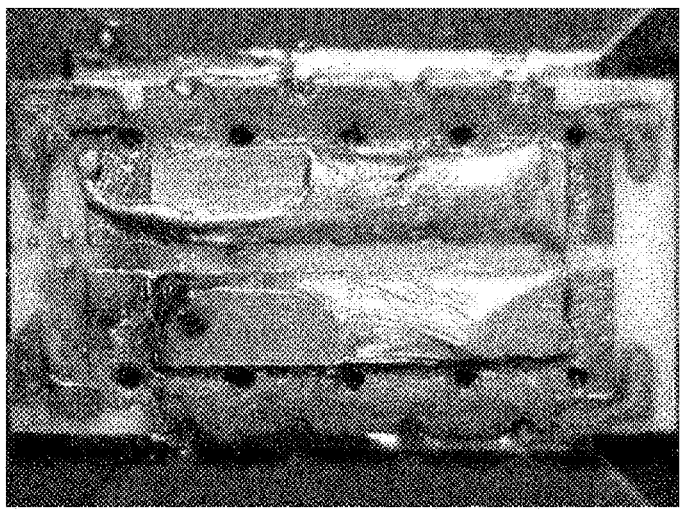

FIGS. 7 to 9 are photographs showing results of fusing experiments conducted under the same environment for a structure with no flux, a structure in which a flux is applied on a fusible element and a fusible element structure in which three flux cores are embedded in accordance with the embodiment of the present disclosure.

First, as shown in FIG. 7, in the structure with no flux, a fusible element is not evenly fused and a fusing defect phenomenon frequently occurs. After fusing, a current path may be formed in a considerable area, and an insulation resistance of about 500 mΩ was measured in the remains of the fusible element on both sides.

FIG. 8 shows a result of experimenting fusing characteristics in a structure in which a flux is applied to the upper surface of a fusible element as described above in the background art. Although a phenomenon occurred in which the fusible element was attracted by the flux and collected to fusible element electrodes on both sides, it was observed that a current path was formed after fusing in many examples. An insulation resistance measured at the remains of the fusible element on both sides was 5 kΩ on average. This is a value that can cause an energization or an arc in a protection device when a high overcurrent is generated, and is a value that may cause an explosion accident in a battery pack.

FIG. 9 shows a result of experimenting fusing characteristics in a fusible element structure in which three flux cores are embedded as illustrated in (b) of FIG. 4 in accordance with the embodiment of the present disclosure (a flux is not applied to the upper surface of a fusible element). Referring to FIG. 9, it can be confirmed that the fusible element is substantially completely collected to fusible element electrodes on both sides. An insulation resistance measured from the remains of the fusible element on both sides was infinite in all experiment results. That is to say, when two or three flux cores are embedded in accordance with the embodiment of the present disclosure, fusing characteristics were remarkably improved compared to the conventional art, and it was confirmed that no current path was formed as an insulation resistance was measured as infinity even after fusing.

The disclosed disclosure may be modified in various ways within a range that does not impair a basic spirit of the present disclosure. That is, all the embodiments should be interpreted as being illustrative and are not interpreted as being limitative. Accordingly, the scope of protection of the present disclosure should be determined by the accompanying claims, not the above embodiments. If a limited element in the accompanying claims is substituted with an equivalent thereto, the substitution should be construed as belonging to the scope of the protection of the present disclosure.

The invention claimed is:

1. A protection device for a secondary battery, comprising:
    an insulating substrate;
    a first heating element connection electrode and a second
        heating element connection electrode disposed on the insulating substrate along a traverse direction thereof at a first end portion and a second end portion, respectively;

a heating element stacked on the first heating element connection electrode and the second heating element connection electrode to connect them to each other;

a first insulating member disposed on the heating element;

a heating element intermediate electrode disposed on the first insulating member and having a heating element intermediate electrode extension, wherein the heating element intermediate electrode extension protrudes from one end of the heating element intermediate electrode and is configured to be connected to the second heating element connection electrode;

a first fusible element electrode and a second fusible element electrode disposed on the insulating substrate along a longitudinal direction thereof at either side portions;

a fusible element connecting the first fusible element electrode and the second fusible element electrode, disposed over the heating element intermediate electrode and configured to be fused at a fusing current or higher by being heated by the heating element, the fusible element embedding a first flux core, a second flux core and a third flux core thereinside, wherein:

the first flux core is disposed adjacent to the first fusible element electrode, and configured to attract a fused matter of a first side of the fusible element as the fusible element is fused, toward the first fusible element electrode;

the second flux core is disposed adjacent to the second fusible element electrode and, and configured to attract a fused matter of a second side of the fusible element toward the second fusible element electrode, and the third flux core is disposed between the first flux core and the second flux core, wherein the first and second flux cores are spaced apart from the third flux cores, respectively, by a predetermined distance, and the first flux core and the second flux core are activated at a first activation temperature, and the third flux core is activated at a second activation temperature lower than the first activation temperature.

2. The protection device according to claim 1, wherein, on a periphery of the insulating substrate, terminal extensions are formed concavely inward of vertical walls to extend from the first heating element connection electrode, the second heating element connection electrode, the first fusible element electrode and the second fusible element electrode, respectively, so as to guide downward fused matters of the fusible element, and a conductive material is printed on inner wall surfaces of the terminal extensions to reduce insulation resistances of the respective electrodes.

3. A battery pack comprising:

a protection device for a secondary battery according to claim 1; and at least one battery cell in which the protection device for a secondary battery is connected in terms of circuit between a positive terminal and a negative terminal.

4. A battery pack comprising:

a protection device for a secondary battery according to claim 2, and at least one battery cell in which the protection device for a secondary battery is connected in terms of circuit between a positive terminal and a negative terminal.

5. The protection device according to claim 1, further comprising:

a second insulating member disposed between the heating element and the insulating substrate to maintain an insulating state therebetween.

6. The protection device according to claim 1, wherein:

the first heating element connection electrode has a wing part extending from one end portion thereof such that the first heating element connection electrode has "¬" shape;

the second heating element connection electrode has a wing part extending from one end portion thereof such that the second heating element connection electrode has "⌊" shape; and the heating element are stacked on the wing part of the first heating element connection electrode and the wing part of the second heating element connection electrode.

* * * * *